(12) United States Patent
Amir et al.

(10) Patent No.: US 9,275,678 B2
(45) Date of Patent: Mar. 1, 2016

(54) PRIMARY STORAGE MEDIA WITH ASSOCIATED SECONDARY STORAGE MEDIA FOR EFFICIENT DATA MANAGEMENT

(75) Inventors: Arnon Amir, Saratoga, CA (US);
Wayne I. Imaino, San Jose, CA (US);
David A. Pease, San Jose, CA (US);
Rainer Richter, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 12/732,151

(22) Filed: Mar. 25, 2010

(65) Prior Publication Data

US 2011/0238905 A1 Sep. 29, 2011

(51) Int. Cl.
*G06F 12/00* (2006.01)
*G06F 17/00* (2006.01)
*G11B 27/00* (2006.01)
*G11B 23/04* (2006.01)
*G11B 15/68* (2006.01)

(52) U.S. Cl.
CPC .......... *G11B 27/002* (2013.01); *G11B 15/6835* (2013.01); *G11B 23/042* (2013.01); *G11B 2220/41* (2013.01); *G11B 2220/655* (2013.01); *G11B 2220/93* (2013.01)

(58) Field of Classification Search
None
See application file for complete search history.

(56) References Cited

U.S. PATENT DOCUMENTS

| | | | |
|---|---|---|---|
| 5,369,532 A | 11/1994 | Dodt et al. | |
| 5,572,378 A * | 11/1996 | Schwarz et al. | 360/48 |
| 5,710,676 A | 1/1998 | Fry et al. | |
| 5,809,543 A * | 9/1998 | Byers et al. | 711/162 |
| 6,049,848 A | 4/2000 | Yates et al. | |
| 6,493,166 B1 * | 12/2002 | Takayama | 360/69 |
| 6,718,436 B2 | 4/2004 | Kim et al. | 711/114 |
| 6,766,520 B1 * | 7/2004 | Rieschl et al. | 719/321 |
| 6,779,080 B2 | 8/2004 | Basham et al. | |
| 6,937,411 B2 | 8/2005 | Goodman et al. | |
| 7,020,656 B1 | 3/2006 | Gong | 707/101 |
| 7,047,250 B1 | 5/2006 | Agarwal et al. | 707/102 |

(Continued)

FOREIGN PATENT DOCUMENTS

| | | | |
|---|---|---|---|
| WO | WO 9745837 A1 * | 12/1997 | |
| WO | 2008/073716 | 6/2008 | G06F 12/16 |

OTHER PUBLICATIONS

Zhang et al. HPTFS: High Performance Tape File System. 2006. In Proceedings of 14th NASA Goddard—23rd IEEE Conference on Mass Storage Systems and Technologies (MSST2006). http://www.dtc.umn.edu/publications/reports/2006_11.pdf.*

(Continued)

*Primary Examiner* — Yaima Rigol
(74) *Attorney, Agent, or Firm* — Zilka-Kotab, PC

(57) ABSTRACT

A system according to one embodiment includes a tape cartridge, the tape cartridge comprising: a housing; a magnetic recording tape in the housing; and a non-tape nonvolatile memory coupled to the housing, the nonvolatile memory being for storing therein an index comprising file system information for a plurality of files stored on the magnetic recording tape. A method for storing data on a tape cartridge according to one embodiment includes writing a plurality of files to a magnetic recording tape of a tape cartridge; and writing an index to a non-tape nonvolatile memory of the tape cartridge, the index including information about locations of data of the plurality of files on the magnetic recording tape.

24 Claims, 11 Drawing Sheets

(56) References Cited

U.S. PATENT DOCUMENTS

| | | | |
|---|---|---|---|
| 7,103,811 | B2 | 9/2006 | Talagala et al. |
| 7,277,246 | B2 * | 10/2007 | Barbian et al. ............... 360/69 |
| 7,430,647 | B2 | 9/2008 | Sandorfi et al. ............. 711/162 |
| 7,454,406 | B2 | 11/2008 | Kaplan et al. |
| 7,469,241 | B2 | 12/2008 | Bellamkonda et al. .......... 707/2 |
| 8,099,758 | B2 * | 1/2012 | Schaefer et al. ................. 726/1 |
| 8,176,009 | B2 | 5/2012 | Meller et al. |
| 2005/0071390 | A1 * | 3/2005 | Midgley .............. G06F 11/1451 |
| 2005/0125602 | A1 * | 6/2005 | Ehrlich ......................... 711/112 |
| 2005/0152670 | A1 * | 7/2005 | Skaar ............................. 386/46 |
| 2005/0190660 | A1 | 9/2005 | Wakelin et al. |
| 2006/0106891 | A1 | 5/2006 | Mahar et al. |
| 2007/0021140 | A1 * | 1/2007 | Keyes et al. .................. 455/522 |
| 2007/0088754 | A1 | 4/2007 | Brannon et al. |
| 2007/0206308 | A1 * | 9/2007 | Bates et al. ..................... 360/55 |
| 2007/0220029 | A1 | 9/2007 | Jones et al. ................... 707/101 |
| 2007/0239655 | A1 | 10/2007 | Agetsuma et al. |
| 2008/0046670 | A1 | 2/2008 | Lam |
| 2009/0276593 | A1 * | 11/2009 | Jacobson et al. ............. 711/162 |
| 2010/0157766 | A1 * | 6/2010 | Gregg et al. ............... 369/53.41 |
| 2010/0280651 | A1 * | 11/2010 | Edling et al. ................. 700/214 |
| 2011/0238716 | A1 | 9/2011 | Amir et al. |
| 2011/0238906 | A1 | 9/2011 | Amir et al. |

OTHER PUBLICATIONS

Pease et al. The Linear Tape File System. May 3-7, 2010. 2010 IEEE 26th Symposium on Mass Storage Systems and Technologies (MSST). pp. 1-8.*

Nana Långstedt, Linux file permissions, tuxfiles.org, Oct. 5, 2005, http://www.tuxfiles.org/linuxhelp/filepermissions.html.*

XML, Wikipedia, version as of Mar. 19, 2009, http://en.wikipedia.org/wiki/XML.*

Encryption, Wikipedia, version as of Mar. 1, 2009, http://en.wikipedia.org/wiki/Encryption.*

U.S. Appl. No. 12/732,158, filed Mar. 25, 2010.

U.S. Appl. No. 12/732,159, filed on Mar. 25, 2010.

Nath et al., "Online Maintenance of Very Large Random Samples on Flash Storage" PVLDB '08, Aug. 23-28, 2008, Auckland, New Zealand Copyright 2008 VLDB Endowment, ACM 978-1-60558-305—Jan. 8, 2008.

Lee et al., "Energy-Aware Memory Allocation in Heterogeneous Non-Volatile Memory Systems" ISLPED '03, Aug. 25-27, 2003, Seoul, Korea Copyright 2003 ACM 1-58113-682-X/03/0008, p. 420-423.

Mathur et al., "Capsule: An Energy-Optimized Object Storage System for Memory-Constrained Sensor Devices" SenSys '06 Nov. 1-3, 2006, Boulder, Colorado, USA Copyright 2006 ACM 1-59593-343-3/06/0011, p. 195-208.

Huang et al., "Data Grid for Large-Scale Medical Image Archive and Analysis" MM '05, Nov. 6-11, 2005, Singapore Copyright 2005 ACM 1-59593-044-2/05/0011, p. 1005-1013.

Narayanan et al., "Write Off-Loading; Practical Power Management for Enterprise Storage" Copyright 2008 ACM Transactions on Storage, vol. 4, No. 3, Article 10, Publication Date: Nov. 2008.

Zhang et al., "BitVault: a Highly Reliable Distributed Data Retention Platform" 2006, p. 27-36.

Zadok et al., "On Incremental File System Development" Copyright 2006 ACM Transactions on Storage, vol. 2, No. 2, May 2006, p. 161-196.

Restriction Requirement/Election from U.S. Appl. No. 12/732,158 dated Mar. 1, 2012.

Non-Final Office Action Summary from U.S. Appl. No. 12/732,159 dated Mar. 28, 2012.

Non-Final Office Action Summary from U.S. Appl. No. 12/732,158 dated Jul. 2, 2012.

Final Office Action from U.S. Appl. No. 12/732,159 dated Nov. 6, 2012.

U.S. Appl. No. 13/651,207, filed on Oct. 12, 2012.

Non-Final Office Action from U.S. Appl. No. 12/732,158 dated Dec. 3, 2013.

Final Office Action from U.S. Appl. No. 12/732,158 dated Feb. 11, 2013.

Jaquette, G. A., "LTO: A better format for mid-range tape," IBM Journal of Research and Development, vol. 47, No. 4, Jul. 2003, pp. 429-444.

Piernas et al., "DualFS: a new journaling file system without metadata duplication," Proceedings of the 16th international conference on Supercomputing, ICS 2002, Jun. 22-26, 2002, pp. 137-146.

Non-Final Office Action from U.S. Appl. No. 12/732,159 dated Jun. 5, 2014.

Examiner's Answer from U.S. Appl. No. 12/732,159 dated Dec. 18, 2013.

Final Office Action from U.S. Appl. No. 12/732,158 dated Jul. 18, 2014.

* cited by examiner

PRIMARY STORAGE MEDIA WITH ASSOCIATED SECONDARY STORAGE MEDIA FOR EFFICIENT DATA MANAGEMENT

BACKGROUND

The present invention relates to tape-based data storage, and more particularly, to storing data on a magnetic tape and storing an index in a nonvolatile memory associated with the magnetic tape.

Data storage drives, such as data tape drives, record information to and read information from media, such as the data tape of a tape cartridge. Data storage drives are often used in conjunction with, for example, a data storage and retrieval system. One example of such a system is an automated data storage library with robotic picking devices, wherein removable media cartridges are selectively transported between storage cells and data storage drives in an automated environment. Herein, automated data storage library, data storage library, tape library system, data storage and retrieval system, and library may all be used interchangeably.

A digital storage tape may contain multiple files. Files and data stored on tape are written to the tape sequentially, in a linear fashion. Unlike hard drives or solid state nonvolatile storage such as flash memory or other nonvolatile memory (NVM), tape does not allow direct-access write of data. In general, tape data can only be written linearly, in append-only mode. For example, the Linear Tape-Open (LTO) standard uses shingling to write tracks to increase tracks density. However, due to shingling, the in-place rewrite of a file or a data block stored in one track would destroy what has been written in the neighboring track.

File management of data on tapes has traditionally been different from that of direct-access storage media. In the latter, file system data structures are commonly used, keeping information such as a hierarchical directory structure, file names, file attributes (e.g., such as size, access information, access rights permissions), and a list of the physical storage blocks containing the file contents, etc. However, since such file system structures must be updated with information when any changes are made to files stored on the media, such file system structures are not well-suited to tapes, which do not allow rewrite of the file system information. While tape-based file system implementations do exist, however, as reading the file system information requires positioning the tape to the end of the recorded data, and any update requires rewriting of a new copy of the entire set of file system structures at the end of the tape data.

One common approach to managing data on tape requires a storage system to manage the tape while storing a separate index of the tape content on an unrelated disk device or other remote direct-access storage media. For example, tape is no longer self-describing. Data stored on the tape cannot be accessed because the tape file index is left in the storage system's database once the tape is taken out of the scope of the storage system. The longevity of the data is limited by the longevity of the storage system, including all its software, databases and hardware it is running on. Hence, while the tape media may preserve the bits intact for years, there is no guarantee that the files will survive as long since their data may no longer be interpretable.

Another approach to storing files on tapes is via utilities such as TAR (Tape ARchive). The TAR program combines a set of source files into a single data set which is written to tape. The TAR file consists of a header, which describes the TAR file contents and retains file metadata, and the body of the TAR file which consists of the source files concatenated together. The TAR program makes the tapes self describing which avoids the dependency on an external index. However, TAR files are not appendable once written. An appended tape therefore may consist of several TAR files. Indexing such a tape will require multiple seeks and reads. Also there is the risk of data loss if a TAR file header is corrupted or its format becomes obsolete or its header and content storage format are found incompatible by the TAR utility attempting to open it, e.g., there are multiple variations of TAR which are not fully compatible with each other. Since the source files are concatenated in the data area, the TAR file header is required to determine the source file boundaries.

Very large TAR files are often challenging to handle during transfer on a network between disk and tape systems. In some practices, the large TAR file is first divided into blocks of certain size, such as 32GB, and the blocks are transferred and written to tape in sequential order. To restore a file from such a tape, all of the blocks have to be read from tape, the complete TAR file has to be reassembled, and only then may the file be accessed by the TAR utility. This process involves one or more copy operations of the entire TAR file, requires a large temporary storage area for TAR assembly.

BRIEF SUMMARY

A system according to one embodiment includes a tape cartridge, the tape cartridge comprising: a housing; a magnetic recording tape in the housing; and a non-tape nonvolatile memory coupled to the housing, the nonvolatile memory being for storing therein an index comprising file system information for a plurality of files stored on the magnetic recording tape.

A method for storing data on a tape cartridge according to one embodiment includes writing a plurality of files to a magnetic recording tape of a tape cartridge; and writing an index to a non-tape nonvolatile memory of the tape cartridge, the index including information about locations of data of the plurality of files on the magnetic recording tape.

A computer program product for storing data on a tape cartridge according to one embodiment includes a computer readable medium having computer readable program code embodied therewith. The computer readable program code includes computer readable program code configured to write a plurality of files to a magnetic recording tape of a tape cartridge; and computer readable program code configured to write an index to a nonvolatile memory of the tape cartridge, the index including information about locations of data of the plurality of files on the magnetic recording tape.

A system for storing data on a tape cartridge having a magnetic recording tape and a non-tape nonvolatile memory according to one embodiment includes a head for writing a plurality of files to a magnetic recording tape of a tape cartridge; a communication device for writing an index to a non-tape nonvolatile memory of the tape cartridge, the index including information about locations of data of the plurality of files on the magnetic recording tape; and a controller for controlling the writing of the files and the index.

Any of these embodiments may be implemented in a magnetic data storage system such as a data storage and retrieval system, which may include one or more drives.

Other aspects and advantages of the present invention will become apparent from the following detailed description, which, when taken in conjunction with the drawings, illustrate by way of example the principles of the invention.

DETAILED DESCRIPTION

Figure 1:
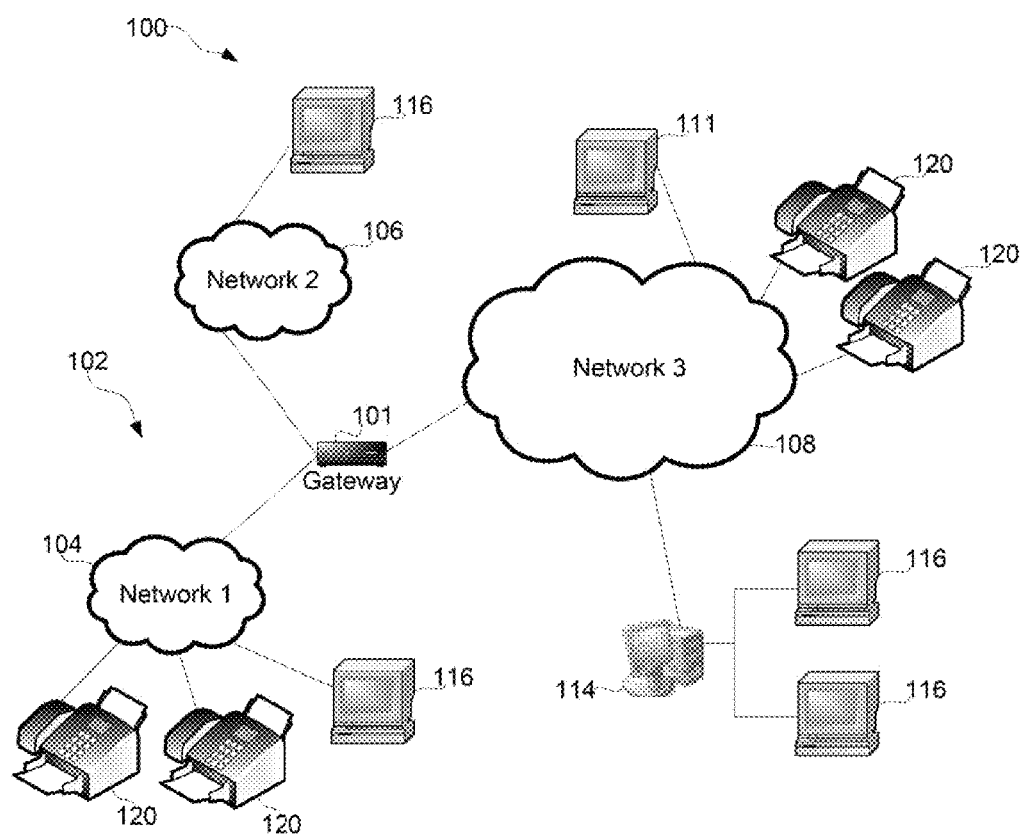
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses methods and systems to utilize an on-cartridge secondary storage, such as Flash memory, read-only memory (ROM), erasable programmable read-only memory (EPROM), resistive random access memory (RRAM), other non-volatile memory (NVM), etc., to store and maintain file system information for all of the files stored on the primary storage (e.g., magnetic tape).

In one general embodiment, a system comprises a tape cartridge. The tape cartridge comprises a housing, a magnetic recording tape in the housing, and a non-tape nonvolatile memory coupled to the housing, the nonvolatile memory being for storing therein an index comprising tile index or file system information for a plurality of files stored on the magnetic recording tape.

In another general embodiment, a method for storing data on a tape cartridge comprises writing a plurality of files to a magnetic recording tape of a tape cartridge and writing an index to a non-tape nonvolatile memory of the tape cartridge, the index including information about locations of data of the plurality of files on the magnetic recording tape.

In another general embodiment, a computer program product for storing data on a tape cartridge comprises a computer readable medium having computer readable program code embodied therewith. The computer readable program code is configured to write a plurality of files to a magnetic recording tape of a tape cartridge and to write an index to a nonvolatile memory of the tape cartridge. The index includes information about locations of data of the plurality of files on the magnetic recording tape.

In yet another general embodiment, a system for storing data on a tape cartridge having a magnetic recording tape and a non-tape nonvolatile memory comprises a head for writing a plurality of files to a magnetic recording tape of a tape cartridge, a communication device for writing an index to a non-tape nonvolatile memory of the tape cartridge, the index including information about locations of data of the plurality of files on the magnetic recording tape, and a controller for controlling the writing of the files and the index.

In another general embodiment, the index may be stored on both tape and in the nonvolatile memory.

As will be appreciated by one skilled in the art, aspects of the present invention may be embodied as a system, method, or computer program product. Accordingly, the present invention may take the form of an entirely hardware embodiment, a software embodiment (including firmware, resident software, micro-code, etc.) operating an apparatus or an embodiment combining software and hardware aspects that may all generally be referred to herein as a "circuit," "module" or "system." Furthermore, the present invention may take the form of a computer program product stored in any tangible medium of expression having computer-usable program code stored in the medium.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), a Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C+ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked storage units, etc. may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

Figure 2:
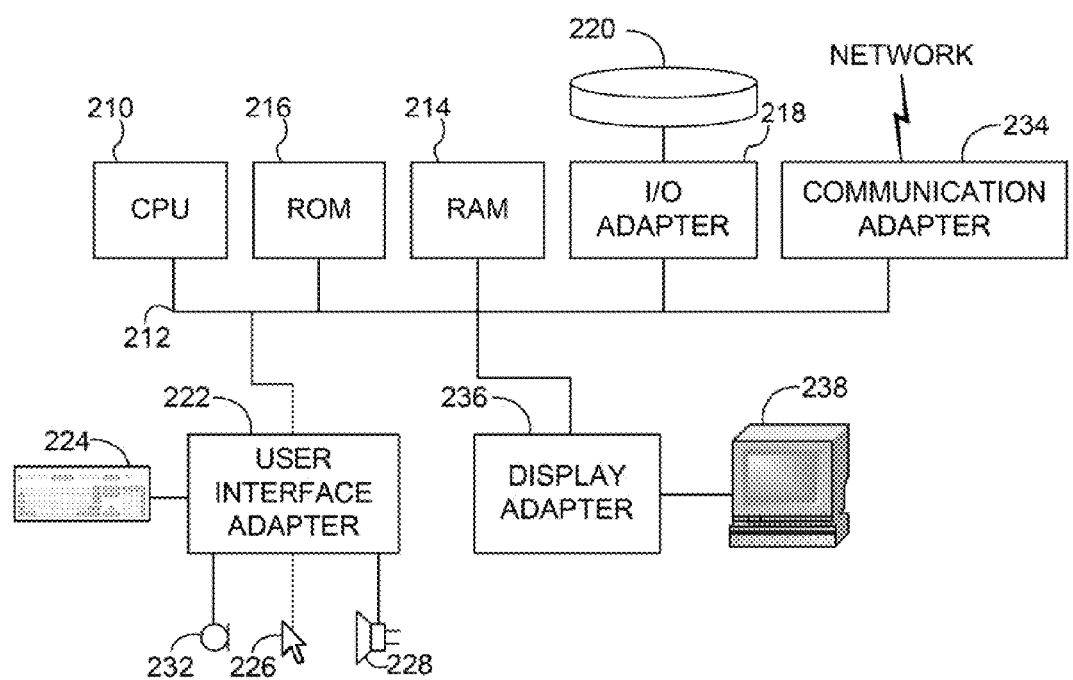
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
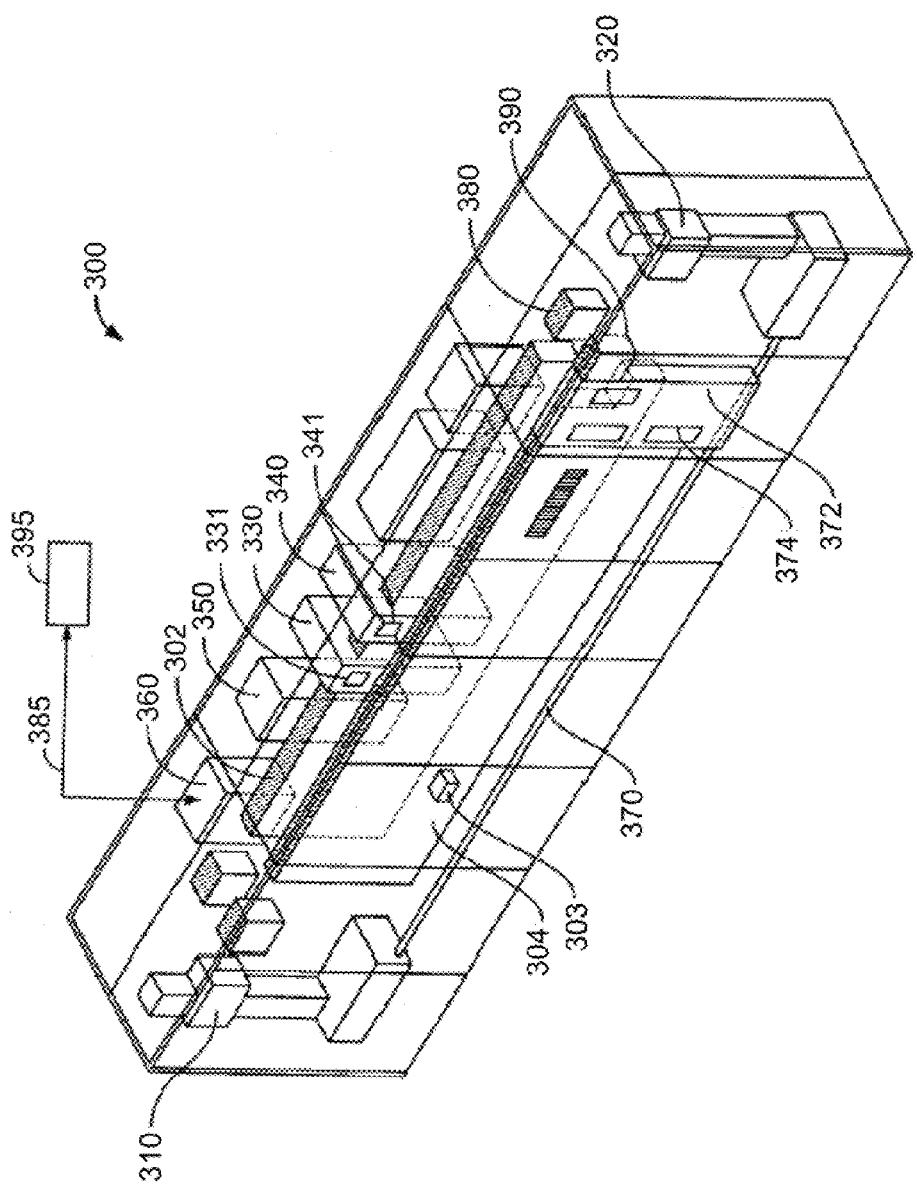
FIG. 3 is an isometric view of one embodiment of a data storage and retrieval system constructed in accordance with the present invention.
Figure 5:
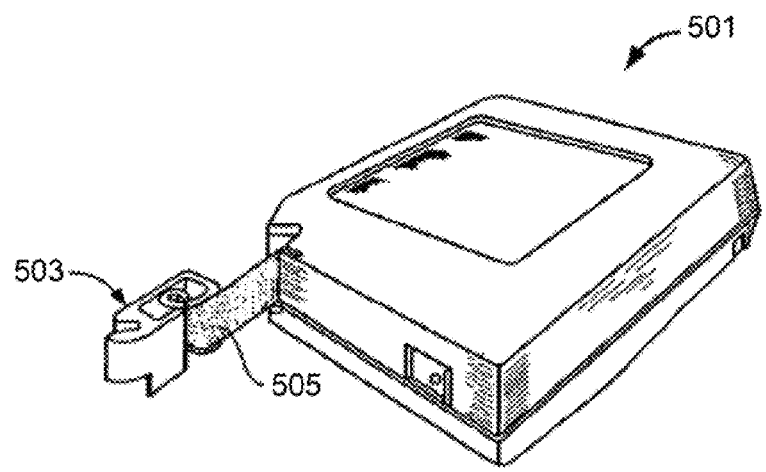
FIG. 5 is an isometric view of a removable tape cartridge used in conjunction with the tape drive of FIG. 4.

Referring to FIG. 3, a data storage and retrieval system 300 is shown. In the embodiment illustrated, data storage and retrieval system 300 is depicted as a robotic library. The upper interface of controller 360 allows data storage and retrieval system 300 to communicate with one or more hosts 395 via link 385. Link 385 may comprise an Ethernet, Infiniband, TCP/IP, Fibre Channel-Arbitrated Loop, SCSI, ESCON, FICON, or the like, depending on the application. The lower interface of controller 360 communicates with a plurality of drives that are positioned in drive enclosures 330 and 340. Drive enclosures 330 and 340 receive removable media cartridges 303 (e.g., see cartridges in FIGS. 5, 6, and 7), via robotic pickers 310 and 320. The removable media cartridges 303 may include or contain magnetic tape, optical tape, optical disk media, magneto-optical disk, CD, DVD, phase-change media, floppy disk, removable hard disk, electronic media, and the like. Robotic pickers 310 and 320 travel along rail 370 to move removable media cartridges 303 from inner storage wall 302 and outer storage wall 304 to drive enclosures 330 and 340 for the purposes of reading and/or writing data. Robotic pickers 310 and 320 also return the removable media cartridges 303 to storage walls 302 and 304.

An import/export station 372 includes access door 374 attached to the side of data storage and retrieval system 300. Access door 374 is preferably pivotally attached to the side of data storage and retrieval system 300; however, access door 374 could be slidably or otherwise attached. An operator panel or access station 350 permits a user to communicate directly with data storage and retrieval system 300. The operator access station 350 typically contains an LCD display, a keyboard or touch screen for user input, and circuits to monitor and control the I/O station doors.

First power component 380 and second power component 390 each comprise one or more power supplies that supply power to pickers 310 and 320, controller 360, operator access station 350, and drive enclosures 330 and 340 of data storage and retrieval system 300. Typically, at least one of the power components 380 and 390 provides direct current (DC) power, since most computer peripheral devices use DC power. One of the power components 380 and 390 may provide alternating current (AC) power as well. Controller 360 is in communication with power components 380 and 390, pickers 310 and 320, operator access station 350, drive enclosures 330 and 340, and data storage drives (see FIGS. 4, 12, 13) of data storage and retrieval system 300.

Figure 4:
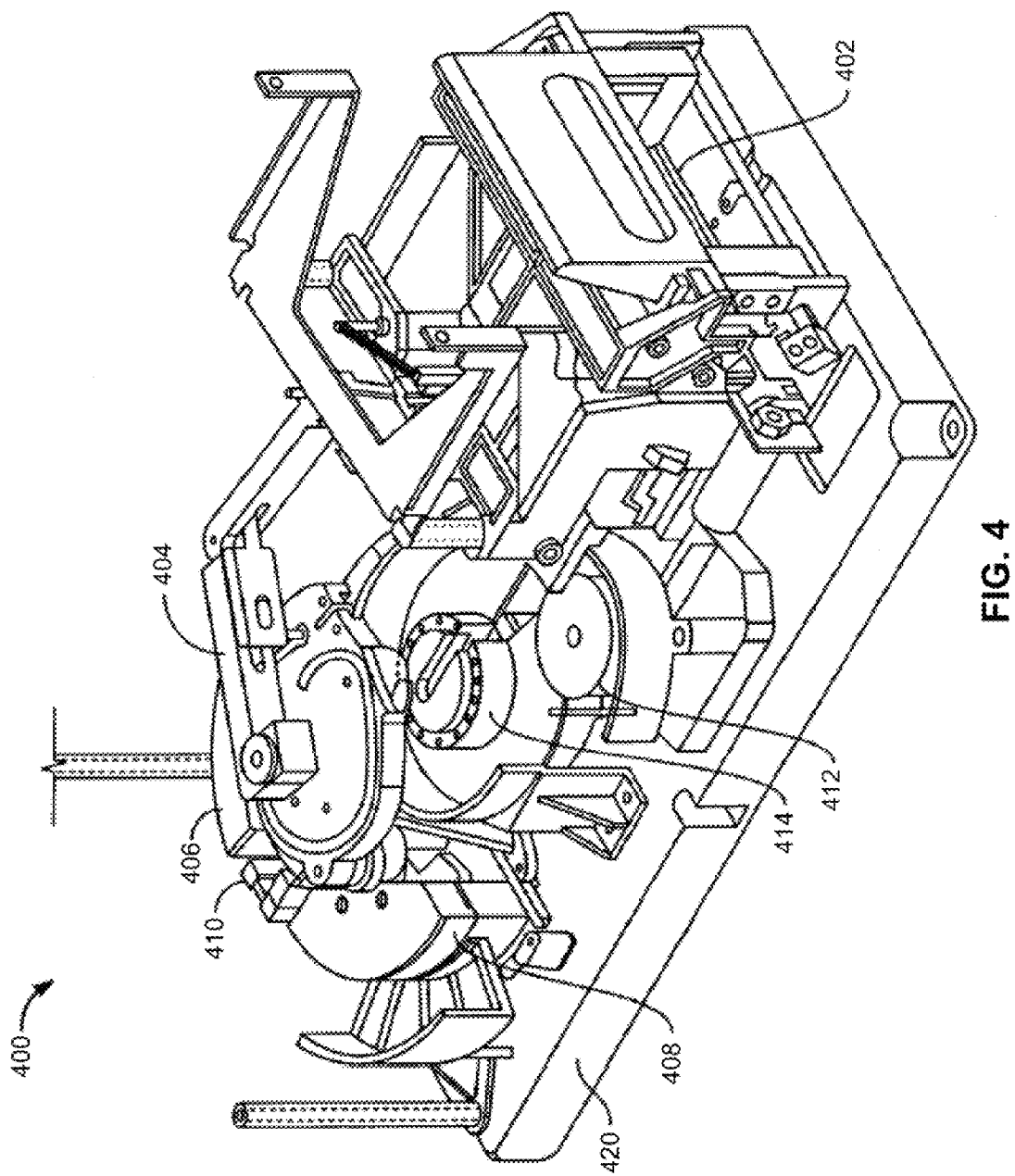
FIG. 4 is an isometric view of a tape drive utilized by the data storage and retrieval system of FIG. 3.

Referring now to FIG. 4, a typical reel-to-reel tape drive 400 is shown. As described above, any removable media data storage drive may be used, such as tape drives, optical and magnetic disk drives, electronic media drives, or any other drives and media as is known to those skilled in the art. A plurality of drives 400 are usually located inside of the library 300 of FIG. 3. Tape drive 400 may be any one of, for example, a family of tape drives using a single-reel tape cartridge, such as the IBM 3480, IBM 3490, IBM 3590, IBM 3592, Digital Linear Tape (DLT), and Linear Tape Open (LTO) tape drives. Cartridge loader 402 receives a single-reel tape cartridge 501 (FIG. 5) and threader 404 (FIG. 4) threads the leader-block 503 (FIG. 5) of the tape 505 around the tape guides 406 (FIGS. 4) and 408, and around the tape tension transducer 412, and into the take-up reel 414. Tape guides 406 and 408 support the tape as the tape moves over the magnetic tape head 410. All of these components are supported by base plate 420. One or more tape drives 400 are located inside drive enclosures 330, 340 (FIG. 3) in order to protect the tape drives 400 (FIG. 4) from dust and debris, as well as extraneous air currents that could disturb the way the magnetic tape 505 (FIG. 5) passes over the magnetic head 410 (FIG. 4).

Figure 8:
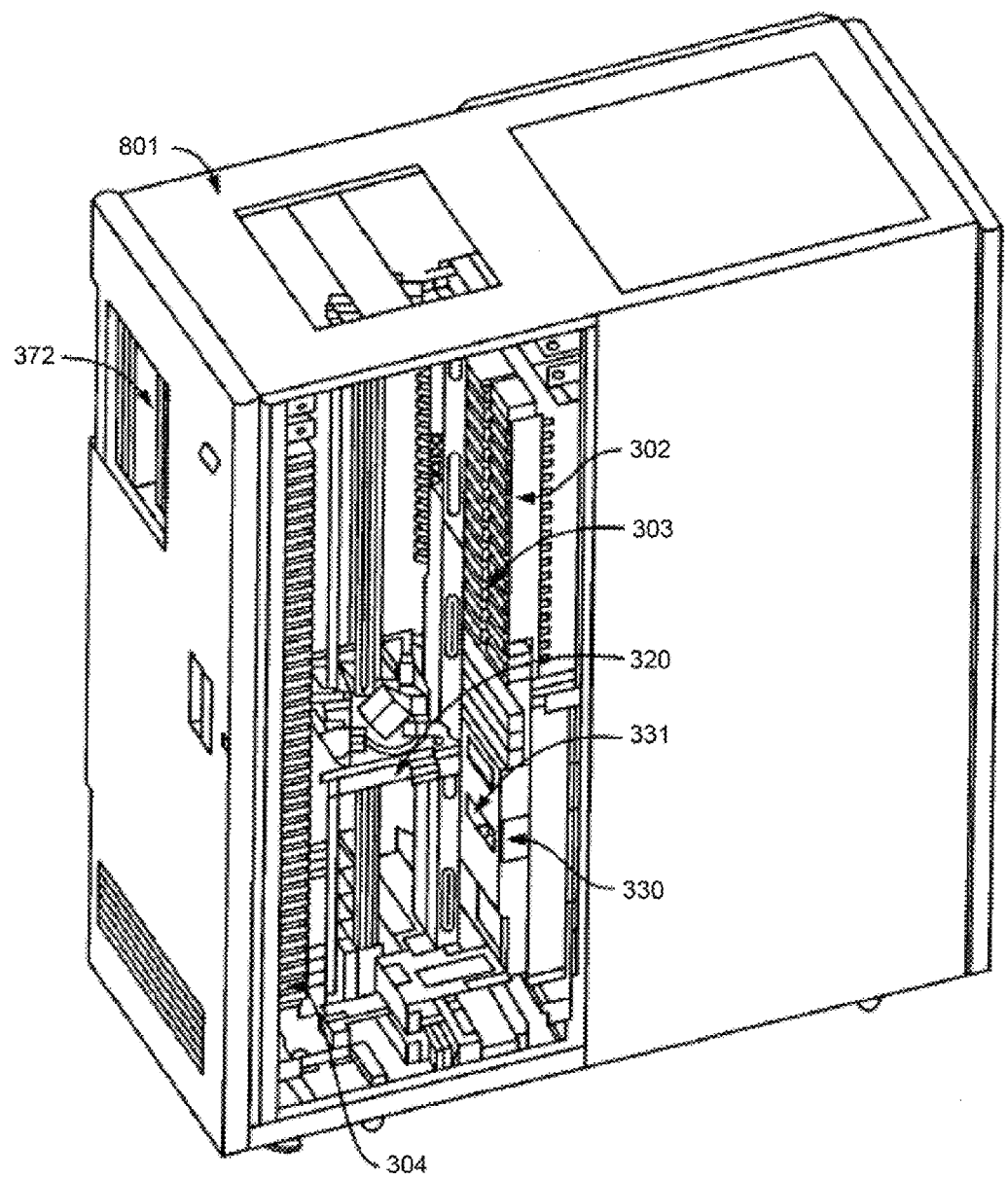
FIG. 8 is an isometric view of a storage module utilized by the data storage and retrieval system of FIG. 3.

The data storage and retrieval system 300 of FIG. 3 is typically assembled from a series of frames or storage modules 301, such as the L-frame type storage module illustrated in FIG. 8. A storage module is an expansion component of the library. Frames, accessors, magazines, etc. may comprise examples of storage modules. The storage module may comprise one or more of the following: one or more storage shelves for holding data storage media, one or more data storage drives for reading and/or writing data on the data storage media, one or more import/export stations for operator access to the data storage media, one or more accessors for moving the data storage media to/from data storage drives and storage shelves, one or more frames or compartments for holding additional storage modules or library components. In the example of FIG. 3, with reference to FIG. 8, the desired number of storage modules 801 are assembled into data storage and retrieval system 300. Storage module 801 comprises a picker 320, a drive enclosure 330, an inner storage wall 302, and an outer storage wall 304. A plurality of removable storage media 303 are located in each storage wall 302, 304. In this example, removable storage media 303 comprises tape cartridges, but may also comprise other types of media such as those described above.

Figure 10:
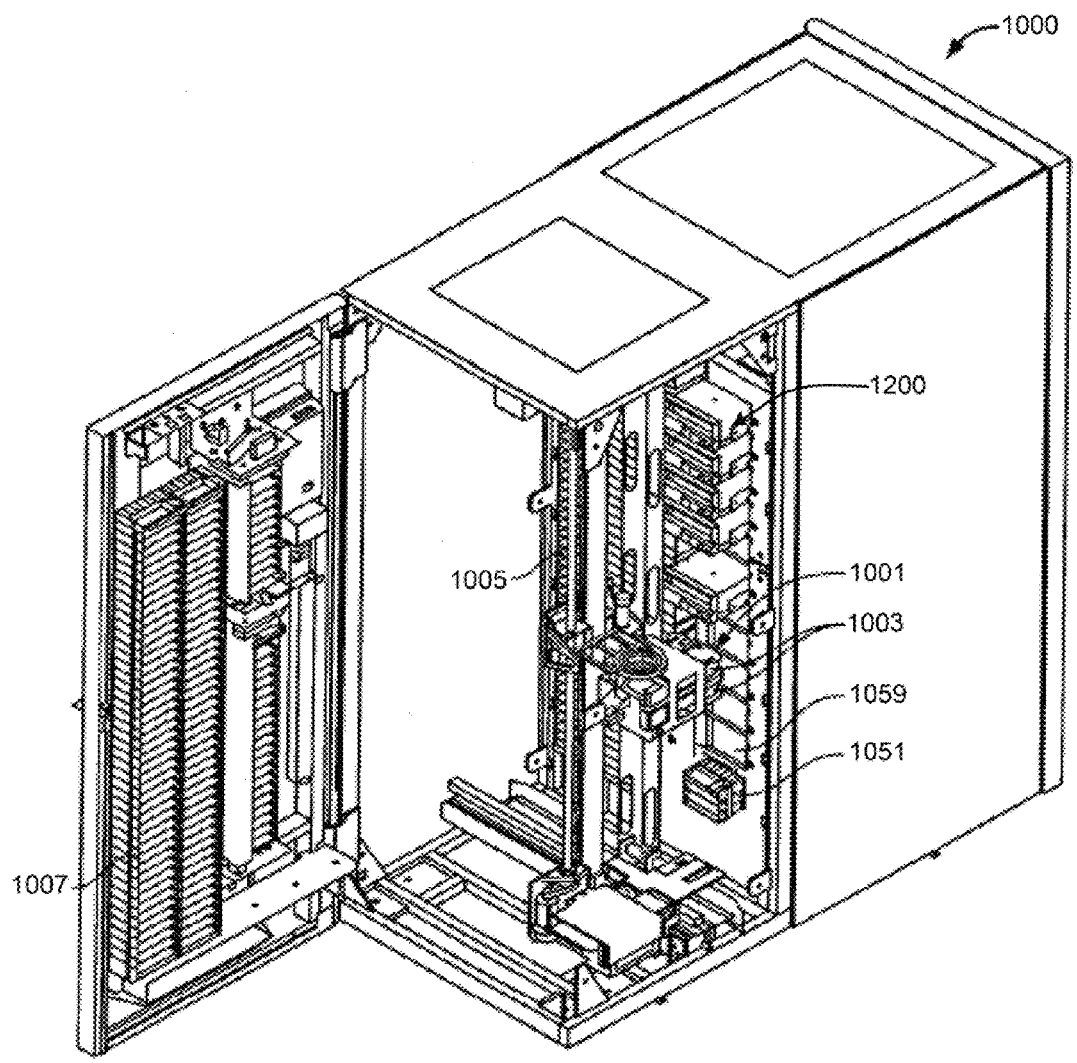
FIG. 10 is an isometric view of an alternate configuration of the storage module of FIG. 8 with a front door open and a rear door closed.
Figure 11:
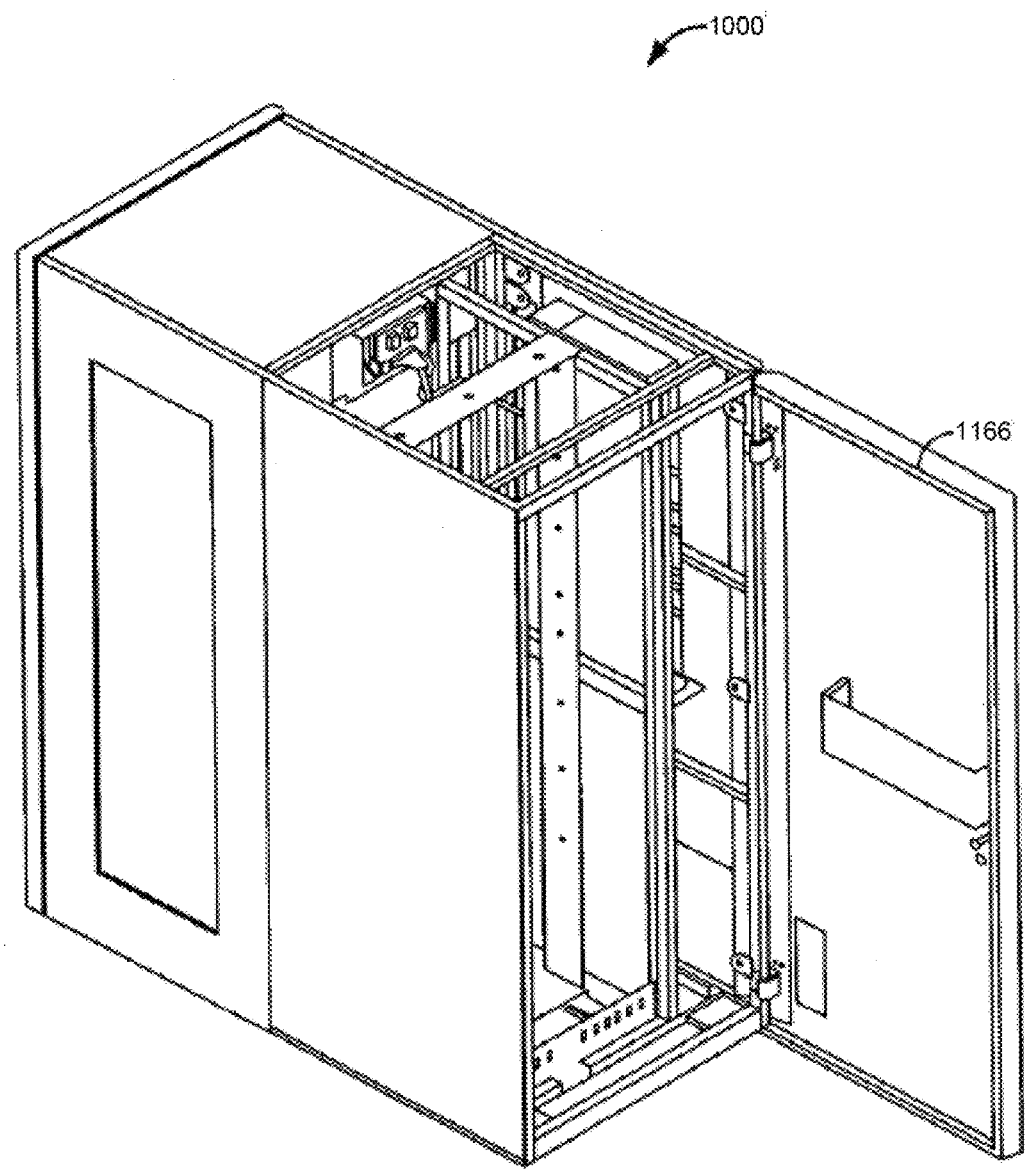
FIG. 11 is a reverse isometric view of the storage module of FIG. 10 with the front door closed and the rear door open.
Figure 12:
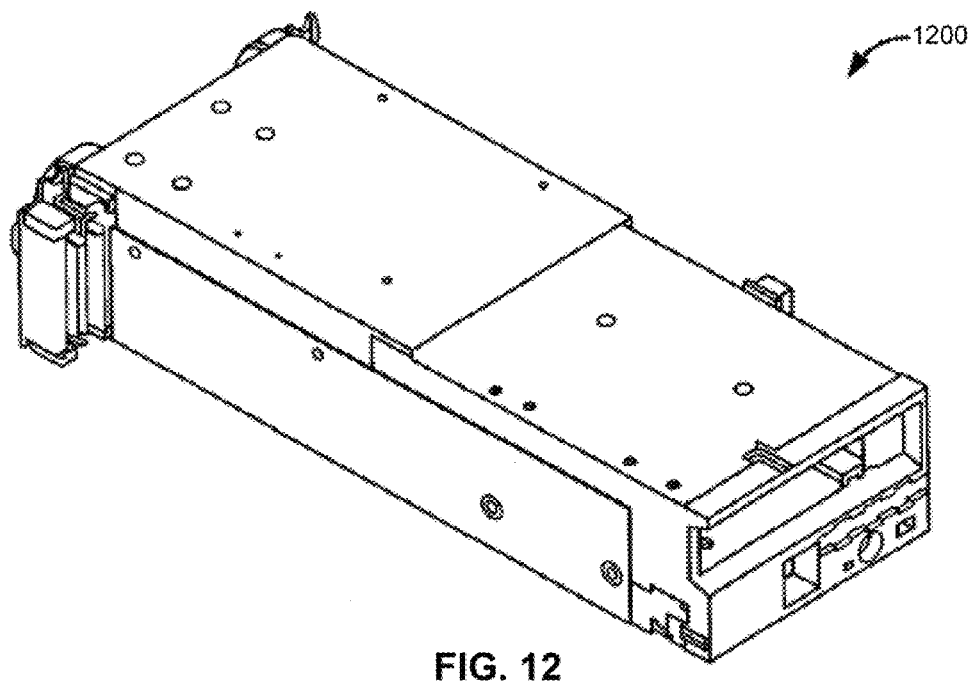
FIG. 12 is a front isometric view of a drive canister.
Figure 13:
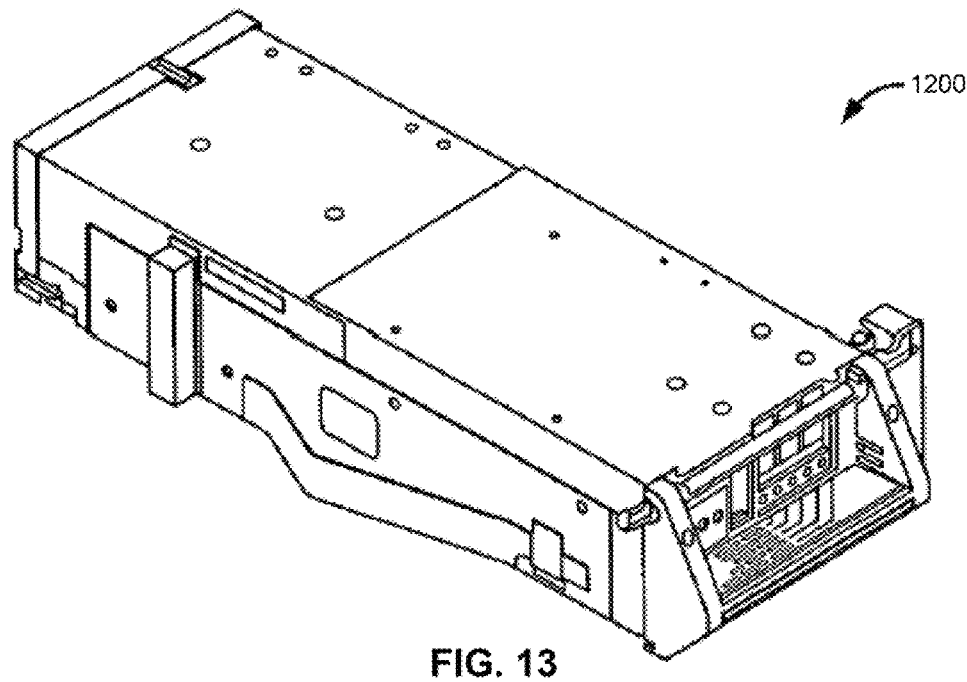
FIG. 13 is a rear isometric view of the drive canister of FIG. 12.

Removable storage media 303 are inserted via robotic pickers 310, 320 into drive enclosures 330, 340 via entrances 331, 341, respectively, where removable storage media 303 are mounted inside the data storage drive, such as tape drive 400 (FIG. 4) or data storage drive 1200 (FIGS. 4, 12 and 13). Each picker 310, 320 (FIG. 3) includes a gripper assembly having a bar code scanner for reading cartridge labels, or other means for identifying the cartridges. As best shown in FIG. 10, a gripper assembly 1001 may contain, for example, a plurality of grippers 1003. The grippers 1003 are mounted in a cage that can pivot from one side of the library to the other. This allows access to both storage walls 1005, 1007 by either gripper.

Figure 6:
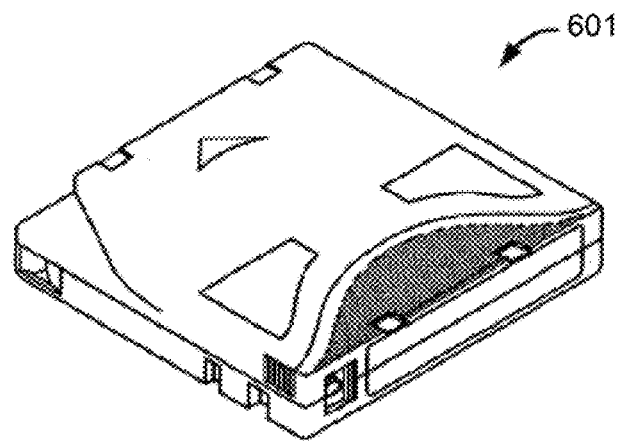
FIG. 6 is an isometric view of an alternate removable tape cartridge usable in conjunction with a tape drive.
Figure 7:
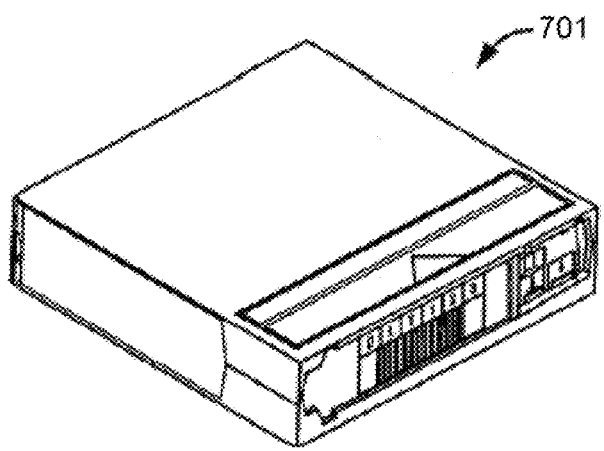
FIG. 7 is an isometric view of another alternate removable tape cartridge usable in conjunction with a tape drive.
Figure 9:
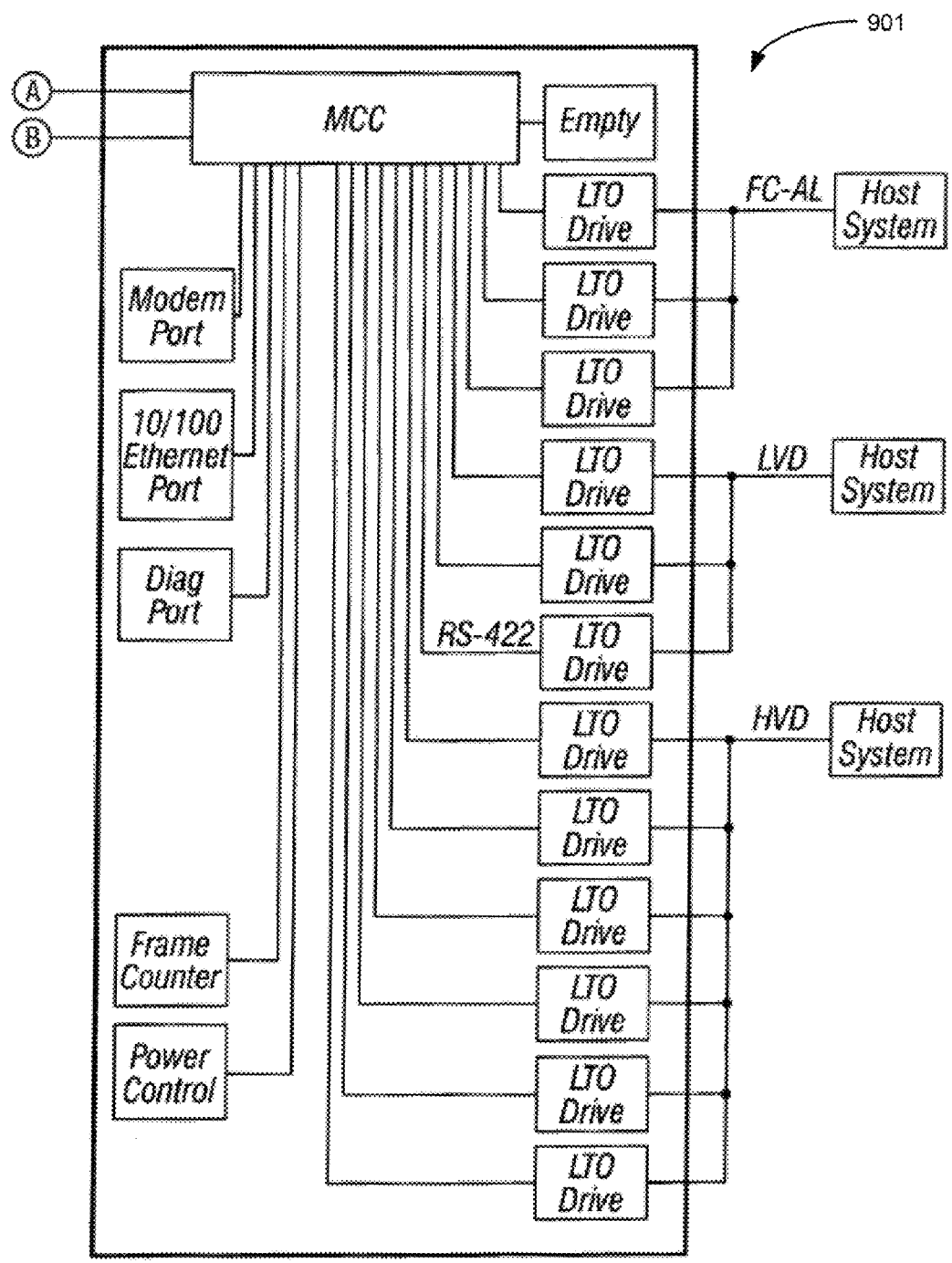
FIG. 9 is a schematic diagram of an alternate storage module utilized by the data storage and retrieval system of FIG. 3.

Referring now to FIG. 9, a schematic diagram of an optional frame or storage module known as a Linear Tape Open (LTO) D-frame 901 is shown. LTO D-frame 901 provides additional storage and may provide additional drives as well. The description is similar to that for storage module 801, except that there may be zero to twelve tape drives for LTO tape cartridges 601 (FIG. 6). FIG. 7 shows another alternate removable tape cartridge 701 usable in conjunction with a tape drive. If no drives are installed, then no MCC and supporting circuits/ports will be installed.

To increase the storage capacity of data storage and retrieval system 300 (FIG. 3), one or more cartridge storage devices 1051 (FIG. 10) may be present to store media cartridges. As used herein, a cartridge storage device is a device capable of holding several media cartridges (defined above) for transportation, storage, and/or use in conjunction with a data storage and retrieval system 300 (FIG. 3). The cartridge storage device may be capable of storing a number of media cartridges, optionally with each cartridge stored on a transport mechanism that feeds the cartridge to the front of the cartridge storage device for access by the library picker 310, 320.

It must also be noted that the teachings herein can be applied to a standalone storage system, such as a tape drive connected to a host system, e.g., via a Fibre-Channel, SCSI, SAS or USB interface, or through Network Attached Storage (NAS) or a Storage Attached Network (SAN) interfaces, for example, using interfaces such as SMB/CIFS. Such storage system may function in a conventional manner and provide further functionality according to the teachings presented herein.

In one embodiment, a nonvolatile memory (NVM), such as Flash memory, read-only memory (ROM), resistive random access memory (RRAM), etc., is embedded into a tape cartridge. In another embodiment, the NVM is in a housing that is removable from a socket of the tape cartridge housing. Such a socket may have connectors therein for communicating with contact pads on the NVM housing. For example, a micro-SD flash memory card may be selectively insertable in and removed from a socket of the tape cartridge.

The nonvolatile memory is not limited to the types listed above, and can be of any type or combination of types of nonvolatile memory. The file system information for data on a tape in the tape cartridge is kept in the nonvolatile memory. Any file system operations, such as directory listing, file searching by name and/or properties, file addition or deletion, file property updates, moving of files between directories, creating file links, locking and unlocking files, etc., file access (and potentially update) and other file system operations may cause modification to the information stored in the nonvolatile memory. The nonvolatile memory allows fast, direct access for reading and updating the file system information, according to preferred embodiments. The actual file data may be kept on the tape (not on the nonvolatile memory). Large files may be have additional file system metadata (such as DSS codes, MXF index files for videos, DICOM metadata of medical imaging data) stored in the nonvolatile memory in order to allow faster, direct access to specific points in the file without the need to read the entire file from the tape. File content may or may not be encrypted on the tape. The flash content may or may not be encrypted.

A system such as this would make tape a much more attractive medium for general-purpose use. The ability to quickly look at the contents of a tape cartridge and determine if data of interest is present would add significantly to the ease and speed of use of the tape. The use of industry-standard directory formats (along with standardization of the tape location information stored on the nonvolatile memory) would make tape more easily portable than is generally the case today. Fairly simple enhancements to the file system to sequentially read and write tape data transparently would mean that many applications that exist today could use tape directly and efficiently with little or no modifications.

Figure 14:
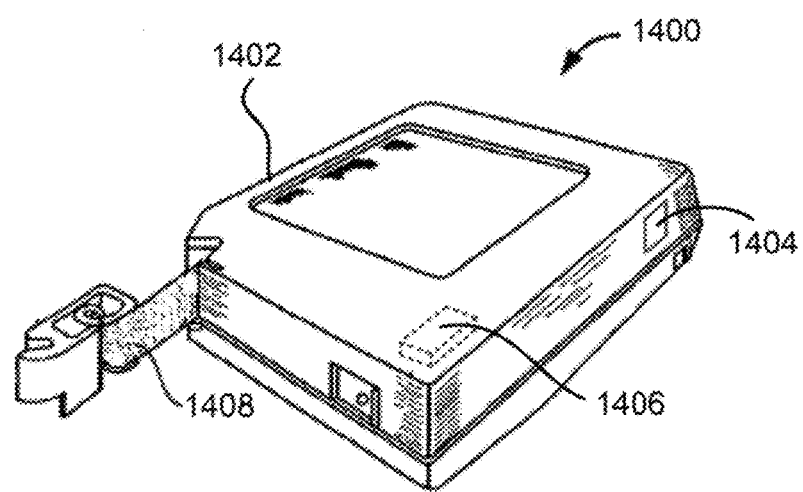
FIG. 14 shows a tape cartridge according to one embodiment.

Now referring to FIG. 14, according to one embodiment, an on-cartridge secondary storage 1406 may be used to store and maintain the file system information for all of the files stored on the primary storage (tape) 1408. In one preferred embodiment, the second storage media 1406 includes a non-volatile memory, such as a Flash memory device, ROM device, etc., embedded into or coupled to the inside or outside of the tape cartridge 1400. The nonvolatile memory is accessible by the tape drive and the tape operating software (the driver software). It could also be made directly accessible by any computer with a USB connection (but not necessarily a tape drive) in order to access information about the data stored on the tape. This may be made possible by including a connector 1404, such as an USB connector, a capacitive coupler communication module, an infrared port, a fiber optic port, serial connector, etc.

In one embodiment, a system includes a tape cartridge, such as tape cartridge 1400 shown in FIG. 14. The tape cartridge 1400 includes a housing 1402, a magnetic recording tape 1408 in the housing 1402, and a non-tape nonvolatile memory 1406 coupled to the housing 1402, the nonvolatile memory 1406 being for storing therein an index comprising file system information for a plurality of files stored on the magnetic recording tape 1408. In some approaches, the nonvolatile memory 1406 may be embedded inside the housing 1402, as shown in FIG. 14. In more approaches, the nonvolatile memory 1406 may be attached to the inside or outside of the housing 1402 without modification of the housing 1402. For example, the nonvolatile memory may be embedded in a self-adhesive label.

According to some approaches, the index may be stored as a mountable file system on the nonvolatile memory 1406, the index comprising file extensions linking references to the files in the index to a physical file location on the magnetic recording tape 1408. Any known indexing format may be used, including but not limited to those having hierarchical directories.

In some approaches, the nonvolatile memory 1406 may be directly accessible by a detached system. The direct access may be wireless access (such as an RFID access, infrared access, optical access, inductive access, capacitive access, etc.) and/or physical access (such as access via a connector for a serial connection, USB connection, Firewire connection, pin to pad connection, other types of surface contacts, etc.). Thus, power, communication and/or control of the nonvolatile memory may be transferred wirelessly without any electric contacts between the housing and the tape drive or the detached system.

A tape cartridge that contains nonvolatile memory or other persistent, direct-access memory is a way of overcoming the lack of a standard file system directory on a tape, as is persistent in the prior art. Because the nonvolatile memory may be readable without spinning the tape, it may reduce wear on the tape, which has limits on load and unload cycles.

Also, in some embodiments, the nonvolatile memory 1406 may function as a tape cartridge cache. In this type of system, at least some of the data stored on the magnetic recording tape 1408 may be immediately accessible using the tape cartridge cache.

According to some approaches, the index may be stored as an XML file in the nonvolatile memory 1406 of the tape cartridge 1400. In some additional approaches, the index may comprise an extent list. The extent list allows for a portion of one of the files stored on the magnetic recording tape 1408 to be updated while maintaining uncharged portions of the file on the magnetic recording tape 1408 intact.

In more approaches, the index may be stored as a plurality of index files, a plurality of database files, etc., on the nonvolatile memory 1406. Additionally, in some approaches, a portion of or all of the nonvolatile memory content may be backed up on the magnetic recording tape 1408. Additionally, in some approaches, the some or all of the nonvolatile memory content may be encrypted.

The directory information may be recorded in an industry-standard format, according to preferred embodiments. This would allow the tape to be "mounted" in the file system name space like any other removable media device. Tape file information such as name, size, and/or modification date may be immediately visible to users. Also, information about the plurality of files may include one or more of additional file system attributes of the plurality of files extended attributes, file forks, alternate data streams, links of the plurality of files, etc.

In one example application, updates to a tape may be buffered on disk and then written to tape prior to unmounting. This has the potential for correcting synchronization problems if system failures occur. Updating the metadata in nonvolatile memory in real time provides a persistent known location to determine the update status for a tape, according to some approaches. This facilitates data recovery or roll back.

Depending on the file system format chosen for recording the file system information, tape-specific information, such as block location (used to locate the file blocks on the tape) may be stored in the file system structures, and/or may be kept in files on the nonvolatile memory, according to preferred embodiments. Such a system may be used on any operating system to allow users to immediately view the contents of a tape (though not to access or write data).

Enhancements to the file system may be made to facilitate the ability to access or write data using this approach. When reading data, the file system may use the directory information on the nonvolatile memory to identify the file to be accessed, and then use the file data to determine how to position and read the associated tape, in some approaches. Writing a new file to the tape, according to some approaches, may involve moving to the end of the written part of the tape, storing the tape position, writing the data, and then recording the new file information in the directory stored on the nonvolatile memory.

The Logical Block Address (LBA) of the first data block of each file may be kept in the file system structures. When a file is to be accessed, the tape drive first seeks to the beginning of this block and then starts reading the file in sequential blocks. In another implementation, files can be stored in non-contiguous series of blocks (called extents), with multiple extents either pointed to directly by the file system information or kept as a table of links as in the File Allocation Table (FAT) layout. Interlacing of multiple files may be desirable when files share some property, such as corresponding audio and video channels which share the same time-line. In this example, neighboring blocks on tape could contain audio and video chunks which are close in time to each other, thus allowing the reading of partial files of all the streams within a common range of time without seeking to different places on the tape. Nonvolatile memory of a large enough size can also function as a cache, in some embodiments. Applications can access data in the immediately accessible cache while the tape drive seeks to the bulk of the data on tape. This can overcome the latency inherent in prior art serial media, such as tape.

Of course, the index may be stored in many forms and formats. In one embodiment, the index of the tape files and directories (the index) may be stored as an XML file with a plurality of name-value pairs in the nonvolatile memory. An example XML schema for an index file storing the files and directories stored in the nonvolatile memory is shown below:

```
<?xml version="1.0" encoding="ISO-8859-1"?>
<volumeserial>xxxxxx</volumeserial>
<index>
    <schemaversion>n.nn</schemaversion>
    <blocksize>nnM</blocksize>
    <updatetime>yyyymmddhhmmssmmm</updatetime>
    [dir_entry . . .]
    [file_entry . . .]
</index>
<dir>
    <name>dirname</name>
    [<modifytime> yyyymmddhhmmssmmm</modifytime>]
    [dir_entry . . .]
    [file_entry . . .]
</dir>
<file>
    <name>filename</name>
    <length>nnnnn</length>
    [<readonly>{no|yes}<readonly>]
    <modifytime>yyyymmddhhmmssmmm</modifytime>
    [<creationtime>yyyymmddhhmmssmmm</creationtime>]
    [<accesstime>yyyymmddhhmmssmmm</accesstime>]
    <extentinfo>
        extent_entry . . .
    </extentinfo>
    [<extendedattributes>
        xattr_entry . . .
```

-continued

```
    </extendedattributes>]
</file>
    <extent>
        <startblock>nnnn</startblock>
        <blockcount>nnnn</blockcount>
    </extent>
    <xattr>
        <key>keyname</key>
        <value>attrvalue</value>
    </xattr>
```

The schema includes such properties of the index as the last time of update and the cartridge serial number, according to some approaches. It may include directories, for which the directory properties are stored. A directory may contain other directories and files. A file may have general properties, such as name and date of creation. It also may have an extent list, which is essentially a description of the file location on tape. Each extent may be composed of the start block and the number of blocks occupied by the file at that extent. A file may span one or more extents. Using multiple extents, according to some approaches, a portion of the file may be updated while keeping the unchanged parts intact.

Extended Attributes (EAs) allow storing additional information about files, as defined by a user's applications. This metadata may be automatically carried over with the file when it is copied by the file system to another storage space with a file system which is compatible with and supports EAs, such as ext2/Linux, XFS, and FAT-16, among others. The content of an EA can be stored in place inside the XML index file, or as a block of data with a reference from the XML index file.

An example of a workflow describing the major file operations performed by the file system to manage the tape data and index on a dual partition tape is included below according to one embodiment:

Load (Mount)
1. Load the tape.
2. Access the index on nonvolatile memory.
3. Read index and build in-memory data structures used to describe tape content (directories and files) and to access data.
4. Mount the tape as a name space under the file system.

Open File
1. Access the built in-memory data structures to access/create file just as for disk file system.
2. Mark that file is open in in-memory data structure.

Read File
1. Get extent information from in-memory structures.
2. Position tape to appropriate block.
3. Read tape and return data to application.

Write (New File)
1. Position tape to end of current data.
2. Query tape position.
3. Write data to tape.
4. Record position and length of data in in-memory structures.
5. Repeat steps 3 and 4 for subsequent sequential writes.

Write (Append to File)
1. If overwriting part of existing last data block:
   a. Read last data block.
   b. Adjust in-memory extent information to exclude last block.
2. Position and write data as when writing a new file.
3. Add extent information for new extent of file to in-memory structures.

Write (Modify an Existing File)
1. If overwriting part of existing (hut not last) data block:
   a. Adjust in-memory extent information to exclude current version of the block.
2. Position and write data as when writing a new file.
3. Write new version of the modified block.
4. Add new extent information for extent of new block's to in-memory structures, in place of excluded block.

Close File
1. Insure all data in buffers is flushed to tape.
2. Write EOF tape mark.
3. Update index information on nonvolatile memory.

Synchronization
1. Write any buffered data to tape.
2. Update nonvolatile memory (if any changes were made).

Eject (Unmount)
1. Unmount the file system name space.
2. Write end of data (end of tape) tape mark, if changed.
3. Write updated index information from in-memory structures to the nonvolatile memory.
4. Physically eject tape.

According to another embodiment, a second file system for nonvolatile memory content may be described. Due to the tight integration of tape data with directory information, users may be prohibited from directly modifying the tape's directory or a file's metadata stored on the nonvolatile memory. This information may be operated and managed by the file system and the tape device driver in some embodiments. However, additional file-related information may be recorded on the nonvolatile memory, such as user file metadata, a searchable index of a file's content, annotations, previews, and/or proxies to support file visualization, etc. These may be coupled with the file system or be separate, as they do not affect the consistency and integrity of the data and files on the tape. Hence, part of the nonvolatile memory may contain its own file system, such as FAT32, to support direct user access, including read, write, and/or update of this additional information stored on the nonvolatile memory.

In another embodiment, a method for storing data on a tape cartridge is included. The method may be performed at least in part by a host, server, processor, etc., which itself may or may not be part of a tape drive or library. The method optionally includes receiving a request to write a plurality of files to a magnetic recording tape and receiving the files. Optionally, the method may include mounting a tape cartridge or requesting mounting of a tape cartridge in a tape drive. Also, the method includes writing a plurality of files to a magnetic recording tape of a tape cartridge, and writing an index to a non-tape nonvolatile memory of the tape cartridge. The index includes information about locations of data of the plurality of files on the magnetic recording tape. Note that the method may be performed on a server or host, with the writing steps including sending instructions to a tape drive to physically write the data. Moreover, the writing steps may be performed by the drive itself.

In some approaches, the index may be written as a mountable file system on the nonvolatile memory. The index includes file extensions linking references to the files in the index to a physical file location on the magnetic recording tape.

In some approaches, the nonvolatile memory may be directly accessible by a detached system. The direct access may be wireless access (such as an RFID access, infrared access, etc.) and/or physical access (such as a serial connection, USB connection, Firewire connection, pin to pad connection, etc.). A tape cartridge that contains nonvolatile memory or other persistent, direct-access memory is a way of overcoming the lack of a standard file system directory on a tape, as is persistent in the prior art. Because the nonvolatile memory may be readable without spinning the tape, it may reduce wear on the tape, which has limits on load and unload cycles.

In some approaches, the nonvolatile memory functions as a tape cartridge cache, and the method further comprises accessing at least some of the data stored on the magnetic recording tape immediately using the tape cartridge cache rather than accessing the information by accessing the tape, which generally is a slower process.

Of course, the index may be written in many forms and formats. In one embodiment, the index is written as an XML file on the nonvolatile memory. Additionally, the index may comprise an extent list. The extent list may allow for a portion of one of the files stored on the magnetic recording tape to be updated while maintaining uncharged portions of the file on the magnetic recording tape intact.

According to more approaches, the index may be written as a plurality of index files and/or as a plurality of database files on the nonvolatile memory. In addition, the method may further comprise writing the content of the nonvolatile memory on the magnetic recording tape.

Also, in some embodiments, the method may further comprise encrypting the index written to the nonvolatile memory. Additionally, the index may further include additional file system attributes of the plurality of files.

According to some embodiments, a file data may be stored encrypted with the key saved in the index file. Each block may be encrypted separately. When a file is deleted, the encryption key may be erased. Hence while the encrypted file data is still on the tape, the data cannot be opened and the file data may be considered as if it was purged from the tape. This operation is made possible by having an over writable index on the nonvolatile memory (and the encryption key erased), a clear advantage of this invention over prior art methods and apparatuses.

This invention is not limited to a specific index file format. Further, the index may be composed of multiple files. In addition, richer metadata associated with data files, such as image thumbnails, video proxies, and/or storyboards, video trailers, MXF, MPEG-7, Quicktime headers, MPEG-4 headers, etc., and other information for multimedia files, DICOM metadata for medical data objects, thumbnails and OCR text for scanned forms and documents, etc., may be stored on the nonvolatile memory. These files may be made available for fast access when the nonvolatile memory is read, and are allowed to be modified.

Multiple other indices may be stored, in addition to the files and directories index. One example is a search index, where the content of data files is analyzed and indexed prior to when or after they were written to tape, and a search index file is created. The search index file may then be stored on the nonvolatile memory, allowing quick access when the nonvolatile memory is read, and further allowing deletion and replacement with an updated search index, for example, when new files are added to the tape.

In another preferred embodiment, the index may be stored as an XML file. In one preferred embodiment, more than one copy of the index is saved. For example the current index and a copy of the previous index, before last modifications were made may be saved. The reason to keep copies of the previous index is to allow a rollback of the last modification. According to a preferred implementation, data on the tape is not erased, only appended. While some blocks may become obsolete (e.g., after file deletion and removal of information from the index), the data remains intact. Hence, by replacing the current index file with the previous index file, and repositioning the end-of-file marker on the tape accordingly, a complete rollback of the index and the data to its previous state can be accomplished. This is particularly useful in a dynamic workflow environment, where intermediate work can be committed to tape and then rolled back the next day, and overwritten with an updated version. Additional rollback to even an earlier version of the tape could be made if copies of correspondingly earlier indexes are kept.

According to one embodiment, a computer program product for storing data on a tape cartridge may comprise a computer readable medium having computer readable program code embodied therewith. The computer readable program code may be configured to write a plurality of files to a magnetic recording tape of a tape cartridge and to write an index to a nonvolatile memory of the tape cartridge. The index may include information about locations of data of the plurality of files on the magnetic recording tape.

In another embodiment, a system for storing data on a tape cartridge having a magnetic recording tape and a non-tape nonvolatile memory may comprise a head for writing a plurality of files to a magnetic recording tape of a tape cartridge, a communication device for writing an index to a non-tape nonvolatile memory of the tape cartridge, and a controller for controlling the writing of the files and the index. The index may include information about locations of data of the plurality of files on the magnetic recording tape.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   a tape cartridge, the tape cartridge comprising:
   a housing;
   a dual partition magnetic recording tape in the housing; and
   a non-tape nonvolatile memory coupled to the housing, the nonvolatile memory being configured for storing therein an index comprising file system information for a plurality of files stored on the magnetic recording tape, wherein the index includes hierarchical directories, information about the files on the magnetic recording tape being stored in the hierarchical directories,
   wherein the file information includes at least one of a name, a size, and a modification or creation date of each of the files on the magnetic recording tape,
   wherein the nonvolatile memory is further configured to store, in addition to the index, user-modifiable information relating to the files on the magnetic recording tape that are described in the index,
   wherein the nonvolatile memory further has therein file system metadata for at least one of the files, wherein the file system metadata is configured to provide direct access to specific physical points on the magnetic recording tape between ends of the at least one of the files on the magnetic recording tape without need to read an entirety of the file from the magnetic recording tape; and
   wherein the nonvolatile memory is further configured to store, in addition to the index and the user-modifiable information, a search index, the search index including information about data content of each of the plurality of files on the magnetic recording tape.

2. The system of claim 1, comprising a socket coupled to the housing, the nonvolatile memory being embodied in a memory card inserted in the socket, wherein the nonvolatile memory is selectively removable from the socket.

3. The system of claim 1, wherein the index is stored as a mountable file system on the nonvolatile memory, the index comprising file extensions linking references to the files in the index to a physical file location on the magnetic recording tape, wherein the nonvolatile memory is also configured for storing therein a second file system that is directly modifiable by the user, the second file system including user files and user file metadata.

4. The system of claim 1, wherein the nonvolatile memory is directly accessible by at least one of a tape drive device and a detached system, the direct access being radio-frequency identification (RFID) access.

5. The system of claim 4, wherein power, communication and control of the nonvolatile memory are transferred wirelessly without any electric contacts between the housing and the at least one of the tape drive and the detached system.

6. The system of claim 1, wherein the nonvolatile memory is configured to function as a tape cartridge cache, wherein at least some of the data stored on the magnetic recording tape is also stored in the nonvolatile memory, the data stored in the nonvolatile memory being immediately accessible using the tape cartridge cache while a tape drive seeks to the data associated with the data stored in both the tape cartridge cache and the magnetic recording tape.

7. The system of claim 1, wherein the index comprises an extent list, wherein the extent list allows for a portion of one of the files stored on the magnetic recording tape to be updated while maintaining unchanged portions of the file on the magnetic recording tape intact.

8. The system of claim 1, wherein the index is stored as at least one of a plurality of index files and a plurality of database files on the nonvolatile memory.

9. The system of claim 1, wherein the information about the plurality of files includes at least one additional file system attributes, extended attributes, file forks, alternate data streams and links of the plurality of files, wherein nonvolatile memory content and file content on the magnetic recording tape is encrypted.

10. The system of claim 1, to wherein the nonvolatile memory is further configured to store two or more copies of the index in the nonvolatile memory.

11. The system of claim 10, wherein at least one of the copies of the index is a version of the index as it existed prior to any updates thereto.

12. The system of claim 10, wherein at least the index and the copies of the index are also stored on the magnetic recording tape.

13. A method for storing data on a tape cartridge, the method comprising:
  writing a plurality of files to a magnetic recording tape of a tape cartridge,
  wherein the writing of the plurality of files is performed using shingled writing;
  writing an index to a non-tape nonvolatile memory of the tape cartridge,
  the index including information about :locations of data of the plurality of files on the magnetic recording tape,
  wherein the index is stored as a mountable file system on the nonvolatile memory,
  wherein the index comprises:
    file extensions linking references to the files in the index to a physical file location on the magnetic recording tape, and
    file information including name, size, and modification or creation date of each of the files on the magnetic recording tape;
  writing, in addition to the index, file system metadata for at least one of the files to the nonvolatile memory,
  wherein the file system metadata is configured to provide direct access to specific points between ends of the at least one of the files without need to read an entirety of the file from the magnetic recording tape;
  outputting the file information for viewing by a user;
  writing the index and file system metadata to the magnetic recording tape after the plurality of files is written to the magnetic recording tape; and
  analyzing and indexing data content of each of the plurality of files on the magnetic recording tape to generate a search index.

14. The method of claim 13, further comprising outputting a representation of the tape as a name space as a removable media device, wherein the index includes hierarchical directories.

15. The method of claim 13, wherein the nonvolatile memory is configured to function as a tape cartridge cache, and further comprising accessing at least some of the data stored on the magnetic recording tape immediately using the tape cartridge cache prior to reading the data from the magnetic recording tape while seeking to the data on the magnetic recording tape.

16. The method of claim 13, further comprising storing at least two copies of the index in the nonvolatile memory.

17. The method of claim 16, further comprising writing an updated version of the index to the nonvolatile memory upon updating at least one of the plurality of files on the magnetic recording tape, and retaining in the nonvolatile memory a version of the index as it existed prior to the updating thereof.

18. The method of claim 13, wherein the index is written as at least one of a plurality of index files and a plurality of database files on the nonvolatile memory, and further comprising storing, in the nonvolatile memory, user-modifiable information relating to the files on magnetic recording tape that are described in the index, the user-modifiable information including an image thumbnail of at least one of the files on the magnetic recording tape.

19. The method of claim 13, further comprising storing user files and user file metadata in a second file system in the nonvolatile memory, wherein the second file system is directly modifiable by the user, wherein a user is prohibited from directly modifying the index in the nonvolatile memory.

20. The method of claim 13, further comprising:
  storing, in addition to the index and metadata, the search index on the nonvolatile memory.

21. The method of claim 13, wherein the nonvolatile memory is directly accessible by at least one of a tape drive device and a detached system, the direct access being REID access.

22. A non-transitory computer program product for storing data on a tape cartridge, the computer program product comprising:
  a computer readable medium having computer readable program code embodied therewith, the computer readable program code comprising:
    computer readable program code configured to write, using shingled writing, a plurality of files to a dual partition magnetic recording tape of a tape cartridge; and
    computer readable program code configured to write an index to a nonvolatile memory of the tape cartridge.
    the index including information about locations of data of the plurality of files on the dual partition magnetic recording tape,
    wherein the index includes hierarchical directories,
    wherein a user is prohibited from directly modifying the index in the nonvolatile memory;
    computer readable program code configured to directly access the index on the nonvolatile memory of the tape cartridge and perform at least one of the following operations while directly accessing the index: search the information in the index by name, search the information in the index by property, add file information, delete file information, update a file property, and move files between directories;
    computer readable program code configured to write the index to the dual partition magnetic recording tape after the plurality of files are written to the magnetic recording tape;
    computer readable program code configured to store at least one identical copy of the index in the nonvolatile memory and the dual partition magnetic recording tape;
    wherein the nonvolatile memory is configured to function as a tape cartridge cache;
    computer readable program code configured to access at least some of the data stored on the dual partition magnetic recording tape immediately using the tape cartridge cache prior to reading the data from the dual partition magnetic recording tape while seeking to the data on the dual partition magnetic recording tape;
    computer readable program code configured to store, in the nonvolatile memory, user-modifiable information relating to the files on the dual partition magnetic recording tape that are described in the index;
    computer readable program code configured to write file system metadata for at least one of the files to the nonvolatile memory and the dual partition magnetic recording tape,
    wherein the file system metadata is configured to provide direct access to specific points between ends of the at least one of the files without need to read an entirety of the file from the dual partition magnetic recording tape; and
    computer readable program code configured to analyze and index data content of each of the plurality of files on the dual partition magnetic recording tape to generate a search index, and store the search index in the nonvolatile memory.

23. A system for storing data on a tape cartridge having a magnetic recording tape and a non-tape nonvolatile memory, the system comprising:
   a head for writing a plurality of files to a magnetic recording tape of a tape cartridge;
   a communication device for writing an index to a non-tape nonvolatile memory of the tape cartridge and directly accessing the index for enabling the following operations while directly accessing the index: search the information in the index by name, search the information in the index by property, add file information, delete file information, update a file property, and move files between directories;
   the index including information about locations of data of the plurality of files on the magnetic recording tape,
   wherein the index is stored as a mountable file system on the nonvolatile memory, and the index is stored as an XML index file with a plurality of name-value pairs in the nonvolatile memory;
   a controller for controlling the writing of the files and he index; and
   wherein the controller is configured to cause the index to be also written to the magnetic recording tape after the plurality of files is written to the magnetic recording tape,
   wherein the controller is configured to store user-modifiable information relating to the files on the magnetic recording tape that are described in the index,
   the user-modifiable information including at least one of an annotation of at least one of the files on the magnetic recording tape, a preview of at least one of the files on the magnetic recording tape, and a proxy to support file visualization of at least one of the files on the magnetic recording tape: and
   wherein the nonvolatile memory is further configured to store, in addition to the index and the user-modifiable information, a search index, the search index including information about data content of each of the plurality of files on the magnetic recording tape.

24. The system of claim 23, wherein a set of extended attributes is stored on the nonvolatile memory for a file stored on the magnetic recording tape, wherein the set of extended attributes includes a block of data that is referenced from within the XML index file, wherein the set of extended attributes are automatically carried over with the file to another storage space when the file is copied to the other storage space.

* * * * *